UNITED STATES PATENT OFFICE.

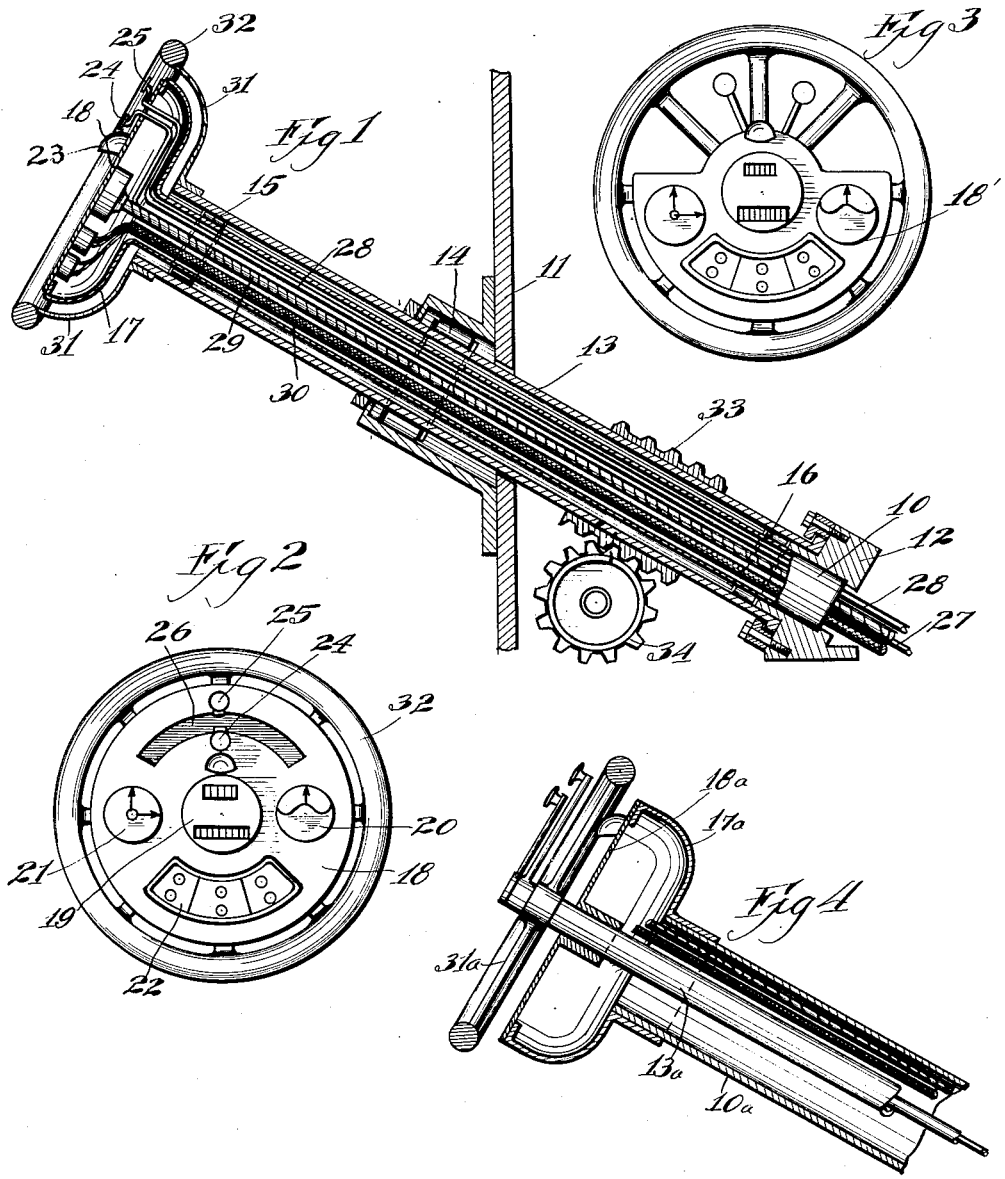

BERTRAM J. GRIGSBY, OF PARK RIDGE, ILLINOIS.

STEERING-COLUMN.

REISSUED

1,396,195.

Specification of Letters Patent.

Patented Nov. 8, 1921.

Application filed September 26, 1919. Serial No. 326,643.

*To all whom it may concern:*

Be it known that I, BERTRAM J. GRIGSBY, a citizen of the United States, residing at Park Ridge, in the county of Cook and State of Illinois, have invented a new and useful Improvement in Steering-Columns, of which the following is a specification.

My invention relates to an improvement in steering columns for use on motor driven vehicles, by which the steering column not only supports a starting wheel and devices for controlling the spark and the throttle valve, but also a switchboard having mounted thereon instruments and devices usually mounted on the dash of the vehicle, connections from said instruments and devices extending through said column whereby they may perform their intended functions.

The switchboard referred to is preferably mounted substantially parallel with the steering wheel and just above the latter, as a result of which the devices carried by said switchboard are always easily seen by the driver without moving from his driving position and such of said devices as require manual operation may be actuated without taking the attention from the driving and with no change of position of the driver.

My invention will be best understood by reference to the accompanying drawings, showing preferred embodiments of my invention in which—

Figure 1 is a longitudinal, sectional view of my improved steering column in place in a vehicle, Fig. 2 is a front elevation of the steering wheel and switchboard shown in Fig. 1, Fig. 3 shows in a view similar to Fig. 2 a modified form of switchboard and Fig. 4 shows in a view similar to Fig. 1, a modified construction of steering column.

Similar numerals refer to similar parts throughout the several views.

As shown in Fig. 1, which is the preferred form of my improved steering column, an inner stationary tube 10, is mounted to extend upwardly and rearwardly of the vehicle through the dash 11 thereof, being rigidly held in such position at its lower end by a bracket 12 fastened in any suitable manner, not shown, to the frame of the vehicle. The tube 10 is surrounded by a second, rotatable tube 13, supported by a bearing 14, preferably of the roller type from the dash 11. Suitable bearings 15 and 16, preferably of the roller type are disposed between said tubes at their ends, as a result of which construction both tubes are securely supported in the position indicated to perform their intended functions.

The tube 10 has rigidly secured to its upper end, a casing 17, circular in form and of a depth sufficient to receive in it and inclose the devices that may be mounted on the switchboard 18, forming the cover of the casing. As indicated in Fig. 2, the switchboard has mounted thereon a speedometer 19, an ammeter 20, a clock 21, and electric switches 22; also a shielded lamp 23 for illuminating the face of the switchboard. Control levers 24 and 25 are provided for the throttle and spark, which levers extend through a slot 26 in the switchboard and are secured in the casing 17 to the upper ends of rods 27 and 28, extending through the tube 10 and connected in the usual manner, not shown, with the parts to be actuated thereby. A flexible shaft 29 extends through the tube 10 into the casing 17 and is connected with the speedometer 19 to operate the same. The switches 22 may be employed to perform the usual functions of the control switches used on motor vehicles, such as controlling the ignition circuit, the lights and the self starter if there be one. As many of these switches may be used as desired and the circuits controlled thereby are connected with said switches by the conductors of a cable 30 extending through the tube 10 into the casing 17.

To conveniently operate the steering wheel, the spokes 31, thereof, which are rigidly secured to the upper end of the tube 13 under the casing 17, are curved to extend outward and around the edge of the casing 17, so that the rim 32 of said wheel, secured to the outer ends of said spokes, encircles the casing 17, with sufficient clearance to permit convenient operation of said wheel. The lower end of the tube 13 has secured thereto a worm 33 meshing with a worm wheel 34, connected in the usual manner, not shown, with the wheels of the vehicle to turn the latter to steer the vehicle.

Where the steering wheel is of large diameter and so disposed that it is desirable for the driver to look through the wheel, a semi-circular switchboard 18' and a casing similarly conformed, may be employed as shown in Fig. 3, in which case the upper half of the steering wheel is left unobstructed. In other respects the construction is the same as described above in connection with Figs. 1 and 2.

In the modified form of my invention shown in Fig. 4, the outer tube 10$^a$ is stationary, being supported in any suitable manner, and the inner tube 13$^a$ is rotatable. The tube 10$^a$ supports at its upper end a casing 17$^a$ inclosed by a switchboard 18$^a$ and the tube 13$^a$ extends through said casing and switchboard and has secured to its end the inner ends of the straight spokes 31$^a$ of the steering wheel, which spokes extend over the switchboard, thus interfering somewhat with a clear view of the latter. The throttle and spark control devices are preferably mounted on the steering wheel and extend through the inner tube 13$^a$ to the parts to be actuated thereby. The apparatus carried by the switchboard 18$^a$ in the casing 17$^a$ may be substantially the same as described above in connection with Figs. 1 and 2. It will be understood that said apparatus may differ in different cases, depending upon the particular control it is desired to exercise from the switchboard in each case and I do not therefore limit myself to any specific grouping or selection of said apparatus. An electric cable 30$^a$ and flexible shaft 29$^a$ extend through the tube 10$^a$ outside of the tube 13$^a$, from the apparatus on the switchboard 18$^a$ to the parts, not shown, connected therewith.

By the term "switching and indicating devices" as used in the claims, I mean apparatus heretofore mounted on the dash of the vehicle to wit: speedometer, electrical measuring instruments, clock, electrical switches for controlling the various electrical circuits as may be used in connection with a motor vehicle, and by the term "switchboard" as used in the claims I mean a support for said switching and indicating devices.

While I have shown my invention in the particular embodiment above described, it will be understood that I do not limit myself to this exact construction as I may employ equivalents known to the art at the time of the filing of this application without departing from the scope of the appended claims.

What I claim is:

1. In a device of the class described, the combination of a stationary tube, a rotatable tube supported by said stationary tube, said tubes being disposed in concentric relation, a steering wheel connected with the upper end of said rotatable tube, an instrument board carrying indicating devices mounted on the upper end of said stationary tube, said devices comprising a speedometer and a flexible shaft extending through said stationary tube to said speedometer.

2. In a device of the class described, the combination of a rotatable steering column, a steering wheel secured to the upper end of said column, a stationary tube concentric with said column and ending adjacent said steering wheel, an instrument board carried by the upper end of said tube parallel with the plane of said wheel, indicating devices mounted on said instrument board, and members extending from said devices through said tube for operating said devices, said devices comprising a speedometer and said members including a flexible shaft for driving said speedometer.

3. In a device of the class described, the combination of a rotatable steering column, a steering wheel secured to the upper end of said column, a stationary tube concentric with said column and ending adjacent said steering wheel, an instrument board carried by the upper end of said tube parallel with the plane of said wheel, indicating devices mounted on said instrument board, and members extending from said devices through said tube for operating said devices, said devices comprising a speedometer and an electrical indicating device and said members comprising a flexible shaft and electrical conductors for controlling the operation of said speedometer and said electrical indicating device.

In witness whereof, I hereunto subscribe, my name this 15th day of September, A. D. 1919.

BERTRAM J. GRIGSBY.